United States Patent

[11] 3,609,243

[72] Inventor Aldo Perna
Milan, Italy
[21] Appl. No. 881,153
[22] Filed Dec. 1, 1969
[45] Patented Sept. 28, 1971
[73] Assignee Societa' Italiana Telecommunicazioni Siemens S.p.A. Milan, Italy
[32] Priority Dec. 4, 1968
[33] Italy
[31] 24570 A/68

[54] PROTECTIVE CIRCUITRY FOR TELECOMMUNICATION SYSTEM

7 Claims, 1 Drawing Fig.

[52] U.S. Cl. .......... 179/15 BF
[51] Int. Cl. .......... H04j 3/14
[50] Field of Search .......... 179/15 A, 15 BF

[56] References Cited

UNITED STATES PATENTS

| | | | |
|---|---|---|---|
| 3,087,144 | 4/1963 | Bianchi | 179/15 BF |
| 3,493,683 | 2/1970 | Schlichte | 179/15 BF |

*Primary Examiner*—Ralph D. Blakeslee
*Attorney*—Karl F. Ross

ABSTRACT: In a time-allocation telephone system with 96 local lines served by a common switching channel via four two-wire branch channels each allotted to a respective group of 24 lines, an integrating network counts the number of phases in a 100-phase clock cycle during which either wire of a particular branch channel is energized. If the number of unit charges stored in the integrating network during a cycle exceeds the maximum number (48) possible during normal operation, a comparator also receiving a fixed reference voltage trips a flip-flop to inhibit the transmission of switching signals to the main channel from the branch channel in the following cycle. At the beginning of each new cycle, the flip-flop is reset with immediately following discharge of the integrating network.

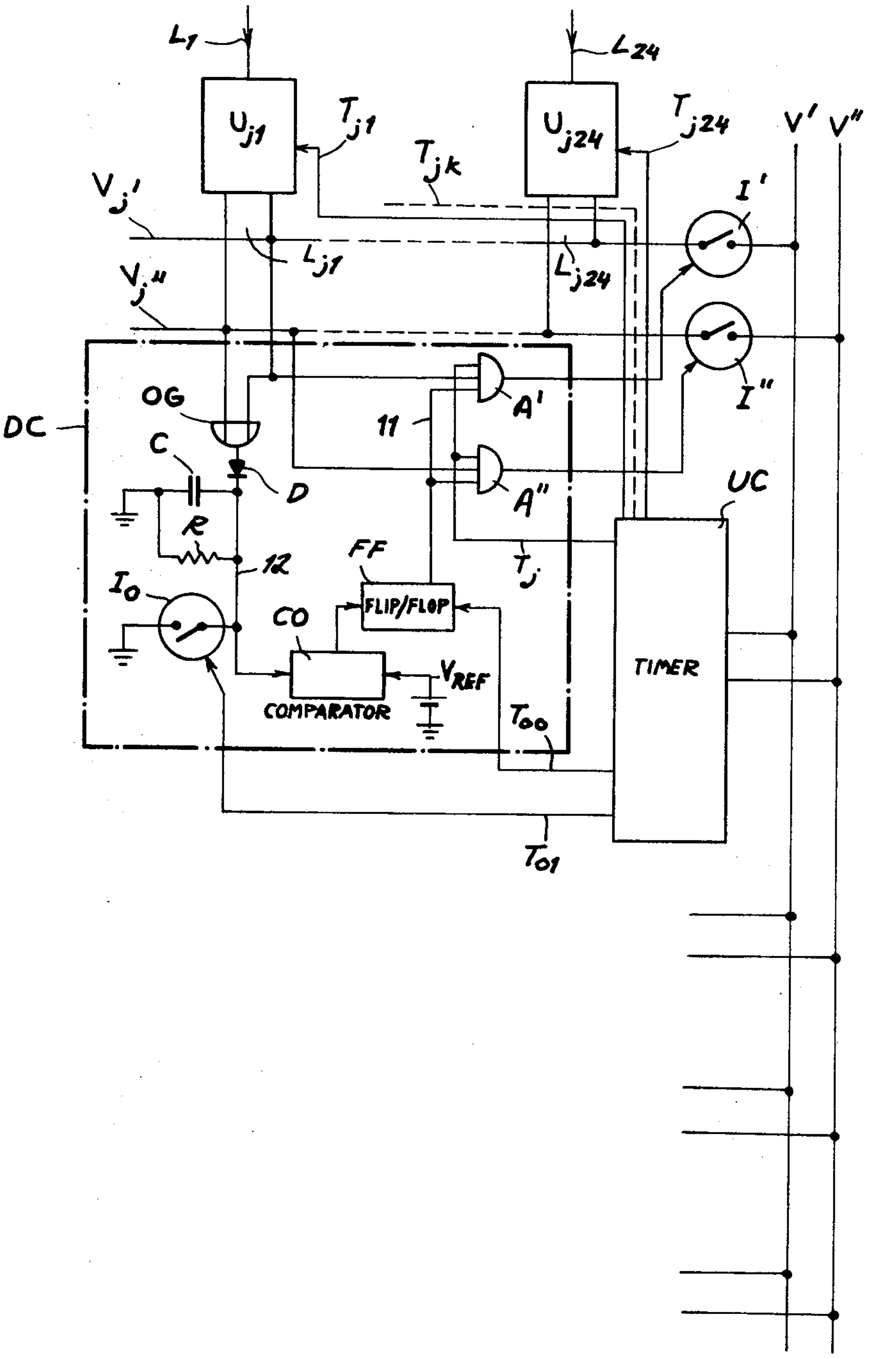
Aldo Perna
INVENTOR.
BY
Karl F. Ross
Attorney

PROTECTIVE CIRCUITRY FOR TELECOMMUNICATION SYSTEM

My present invention relates to a telephone or other communication system wherein a multiplicity of local stations (referred to hereinafter as "subscribers") are periodically connectable to a common channel, such as a trunk line, for exchange of messages with a remote station.

In such a system it is customary to allocate to any calling or called subscriber an individual time slot within a clock cycle extending over an interval of, say, 100 microseconds. With each clock cycle divided into 100 time slots or phases, for example, the several phases may be designated $\Phi_{00}$, $\Phi_{01}$, ....$\Phi_{99}$; of these phases, the first four may be allocated to supervisory operations whereas the remaining 96 are available to as many subscribers.

Upon the establishment and termination of a call, the phase $\Phi_{jk}$ allotted to this particular conversation carries switching signals in the form of digital pulses of substantially constant amplitude which are transmitted over direct-current circuits associated with the engaged subscriber line (as distinct from the variable-amplitude audio signals transmitted over the talking conductors of the line during the conversation proper).

Although the duration of any such switching pulse should not exceed the interval (e.g. of 1 $\mu s$) of the corresponding time shot, failure of equipment associated with a given subscriber line may cause the signal to persist for one or more cycles of the common channel. Such a condition, of course, interferes with the performance of proper switching operations not only for the affected subscriber but also for all other subscribers sharing the same trunk or other communication path.

By subdividing the totality of subscribers served by a common channel into groups connected to that channel during different portions of a cycle, the inconvenience resulting from such a breakdown can be limited to the subscribers of a single group through the operation of circuit breakers insulating that group from the remainder of the system until the defect has been remedied. Frequently, these defects are due only to a transient condition and disappear spontaneously after a brief period. In such a case, of course, it is desirable that service to the affected subscriber and the other subscribers of the same group be promptly restored.

It is, therefore, the general object of my present invention to provide means for instantly detecting a defect, temporary or other, resulting in the continuous energization of a direct-current line shared by a group of subscribers in a time-allocation system of the type referred to above.

Another object is to provide means responsive to the detection of such failure for cutting off the affected subscriber group for a time limited to the duration of the defect.

In accordance with this invention, the aforestated objects are realized by the provision of a monitoring circuit operative throughout a cycle to register the number of phases during which a branch channel serving a group of subscribers is energized, the number of subscribers in the group being substantially less than the number of phases in a cycle whereby the count registered by the monitoring circuit is normally limited to the number $n$ (e.g. 24) of time slots in a clock cycle allocated to the group considered. Under abnormal conditions this count exceeds a threshold related to this number $n$ as the branch channel then carries voltage also during nonallocated time slots. If the branch channel has two wires alternately or jointly energizable for the transmission of different code combinations, a charge-storing element connected to a lead fed by both wires (over suitable insulating elements such as an OR gate in series with a diode) registers either one or two unit charges during each time slot in which either or both wires carry current so that the maximum normal number of unit charges accumulated during any one cycle is $2n$. Thus, a comparison of the sum of the voltage increments duc to these accumulated during unit charges with a reference voltage slightly greater than $2nv$ ($v$ being the unit voltage increment) reveals the presence or absence of equipment failure of the above-described type. With the local lines served by the common channel divided into at least three groups so that the number $n$ of time slots allocated to each group is not greater than one-third the total number (e.g. 100) of time slots per cycle, normal and abnormal conditions are easily distinguished by a comparator which, upon detecting a faulty operation, inhibits the establishment of any connection between that branch channel and the common channel during a period preferably lasting to the end of the next-following cycle.

Advantageously, pursuant to a more particular feature of my invention, the charge-storing element is a condenser forming part of a logical integrating network which registers voltage increments $v$ due to true and spurious switching pulses of binary value "1" generated within a cycle and is discharged at the beginning of the next cycle after an electronic switch has responded to the output of the comparator measuring the charge of the condenser against the aforementioned reference voltage. The electronic switch, which is set whenever the comparator detects a faulty operating condition, prevents the closure of a timer-controlled circuit breaker which otherwise connects the branch channel to the common channel during the fraction of a cycle allocated to this subscriber group. The electronic switch may be periodically reset, preferably at the beginning of each cycle just ahead of the discharge of the integrator. In the example previously considered, this resetting may thus take place during the first phase $\Phi_{00}$ whereas the integrator is discharged in the immediately following phase $\Phi_{01}$.

The invention will be described hereinafter in greater detail with reference to the accompanying drawing the sole FIGURE of which shows a circuit diagram of a representative embodiment.

The system shown in the drawing, constituting part of a telephone exchange, including a pair of switching conductors V′ and V″ of a common channel serving 96 local lines to which they are sequentially connectable by a timer forming part of a control circuit UC. These local lines are divided into four groups of 24 lines each, two lines of one group being shown at $L_{j1}$ and $L_{j24}$. Switching circuits $U_{j1}$, .... $U_{j24}$ serve to connect these local lines to respective subscriber lines $L_1$, ...$L_{24}$ in a manner well known per se. Thus, up to 96 subscribers (out of a possibly much greater total) may communicate with other subscribers associated with the same or a remote exchange via the common channel V′, V″ by way of four branch channels each serving 24 local lines, one such branch channel having been illustrated in the drawing and including a pair of switching conductors $V_j'$, $V_j''$. Two circuit breakers I′, I″, constituted by transistor or other electronic switches, are interposed between leads V′, V″ and wires $V_j'$, $V_j''$ to isolate the lines $L_{j1}$,....$J_{j24}$ from the main channel V′, V″ in the case of equipment failure in any switching circuits $U_{j1}$,....$J_{j24}$; similar circuit breakers are, of course, at the junctions of channel V′, V″ with each of the other three branch channels. A pair of AND gates A′ and A″ have inputs connected to an output lead $T_j$ of timer UC which is energized during 24 phases of a cycle, not necessarily consecutive, to complete the connection between branch $V_j'$, $V_j''$ and main channel V′, V″ whenever any of the switching circuits $U_{j1}$,....$U_{j24}$ has an output; for this purpose, the AND gates A′ and A″ have other inputs respectively connected to the two branch conductors $V_j'$ and $V_j''$. Circuits $U_{j1}$, ....$U_{j24}$ are successively enabled, during respective phases $\Phi_{j1}$, .... $\Phi_{j24}$, via output leads $T_{j1}$, ....$T_{jk}$, ....$T_{j24}$ of timer UC. The AND gates A′ and A″ also have each a third input connected through a lead 11 to the reset output of a flip-flop FF whose resetting input is tied to a timer lead designated $T_{00}$. The setting input of flip-flop FF is energizable by the output of a comparator CO having a first input connected to a lead 12 and a second input connected to a source of fixed reference voltage $V_{REF}$. Lead 12 extends from an integrating network, consisting of a condenser C shunted by a resistor R, which is fed from the output of an OR gate OG through a diode D. OR gate OG has two inputs respectively connected to wires $V_j'$ and $V_j''$ so as to conduct whenever either of these wires receives current from any of the 24 associated switching circuits $U_{j1}$, .... $U_{j24}$. Conductor 12 can be periodically grounded, under the control of a timer lead $T_{01}$, by a circuit breaker $I_0$ bridge across the integrating network RC.

The elements just described form part of a monitoring circuit DC designed to detect any faulty operation of the switching circuits $U_{j1}$, .... $U_{j24}$.

In the normal operation of the system, switching signals are transmitted from any engaged subscriber line $L_1$, .... $L_{24}$ through the corresponding coupling circuit $U_{j1}$, ....$U_{j24}$ to either or both main conductors V', V'' by way of the corresponding branch conductor or conductors $V_j'$, $V_j''$ to initiated or to terminate a call and/or for other purposes such as the timing of the conversation. The energization of either branch conductor $V_j'$, $V_j''$ during a phase of 1-$\mu s$ duration results in the storage of a unit charge on the condenser C of integrator R, C whose time constant is assumed to be large in comparison with a clock cycle of 100 $\mu s$. Even with all 24 time slots occupied, and in the presence of signal current on both branch wires during each phase, the total number of charge units per cycle will not exceed 48 so that comparator CO will not respond if the reference voltage $V_{REF}$ has a somewhat greater magnitude equal to, say, 50-unit voltage increments $v$ since the integrator is discharged at the beginning of each new cycle by a pulse appearing on lead $T_{01}$ during phase $\Phi_{01}$. Flip-flop FF is never set under these circumstances and AND gates A', A'' are unblocked at the allocated times.

If, however, a short circuit or other defect in one or more of the couplers $U_{j1}$, etc. permanently energizes either or both j$V_j'$, $V_j''$, the charge on condenser C exceeds its normal maximum by reaching about 100 or possibly 200 units during one cycle. As soon as the threshold established by reference voltage $V_{REF}$ is surpassed, comparator CO sets the flip-flop FF which thereupon inhibits AND gates A'' and A'' so that branch $V_j''$, $V_j''$ is cut off for the remainder of the cycle. At the beginning of a subsequent cycle, a pulse on lead $T_{00}$ during the first phase $\Phi_{00}$ resets the flip-flop if the abnormal charge on condenser C has disappeared, i.e. if the condenser did not recharge to a similar level after having been discharged in phase $\Phi_{01}$ of the preceding cycle by a signal on lead $T_{01}$ closing the circuit breaker $I_0$.

It will thus be seen that the system described above excludes only a limited number of subscribers from service in the event of equipment failure and instantly restores such service as soon as the defect has been cured.

I claim:

1. In a telecommunication system comprising a multiplicity of local lines, a communication channel common to said lines, and timer means for allocating to each local line a respective time slot of a recurrent clock cycle, the combination therewith of a plurality of branch channels for transmitting direct-current signals from respective groups of said local lines to said common channel, circuit breaker means at the junction of each branch channel with said common channel closable by said timer means for establishing a connection therebetween during the time slots allocated to the lines of the respective group, monitoring means including a lead individually connected to each branch channel for energization thereby during both allocated and nonallocated time slots in the presence of said signals, said monitoring means further including counting means for determining the number of time slots in a clock cycle during which said lead is energized, and electronic switch means triggerable by said counting means for inhibiting closure of said circuit breaker means upon the count of said number of time slots in any one clock cycle exceeding a threshold related to the number of time slots allocated to said respective group.

2. The combination defined in claim 1 wherein said counting means comprises an integrating network connected to said lead a source of reference voltage, and comparison means connected to said network and to said source for measuring the output of said network against said reference voltage.

3. The combination defined in claim 2 wherein said integrating network includes charge-storing means and switching means controlled by said timer means for discharging said charge-storing means after each clock cycle.

4. The combination defined in claim 3 wherein said electronic switch means is connected to said timer means for resetting thereby after each clock cycle just prior to the discharge of said charge-storing means.

5. The combination defined in claim 4 wherein said branch channel comprises a pair of individually and jointly energizable wires, said monitoring means further including an OR gate connecting said wires to said lead.

6. The combination defined in claim 5, further comprising a diode inserted in said lead between said OR gate and said integrating network.

7. The combination defined in claim 5 wherein the magnitude of said reference voltage exceeds $2nv$ where $n$ is the number of allocated time slots and $v$ is a voltage increment due to a unit charge accumulating on said charge-storing means upon energization of either of said wires during one time slot, said number $n$ being at most equal to a third of the total number of time slots in a clock cycle.